Jan. 17, 1939.  T. HARRIS  2,143,876

DRAFTING APPARATUS

Filed Aug. 3, 1935  7 Sheets-Sheet 1

INVENTOR.
Thomas Harris
BY
Barlow & Barlow
ATTORNEYS.

Jan. 17, 1939.　　　T. HARRIS　　　2,143,876
DRAFTING APPARATUS
Filed Aug. 3, 1935　　　7 Sheets-Sheet 2

INVENTOR.
Thomas Harris
BY
Barlow & Barlow
ATTORNEYS.

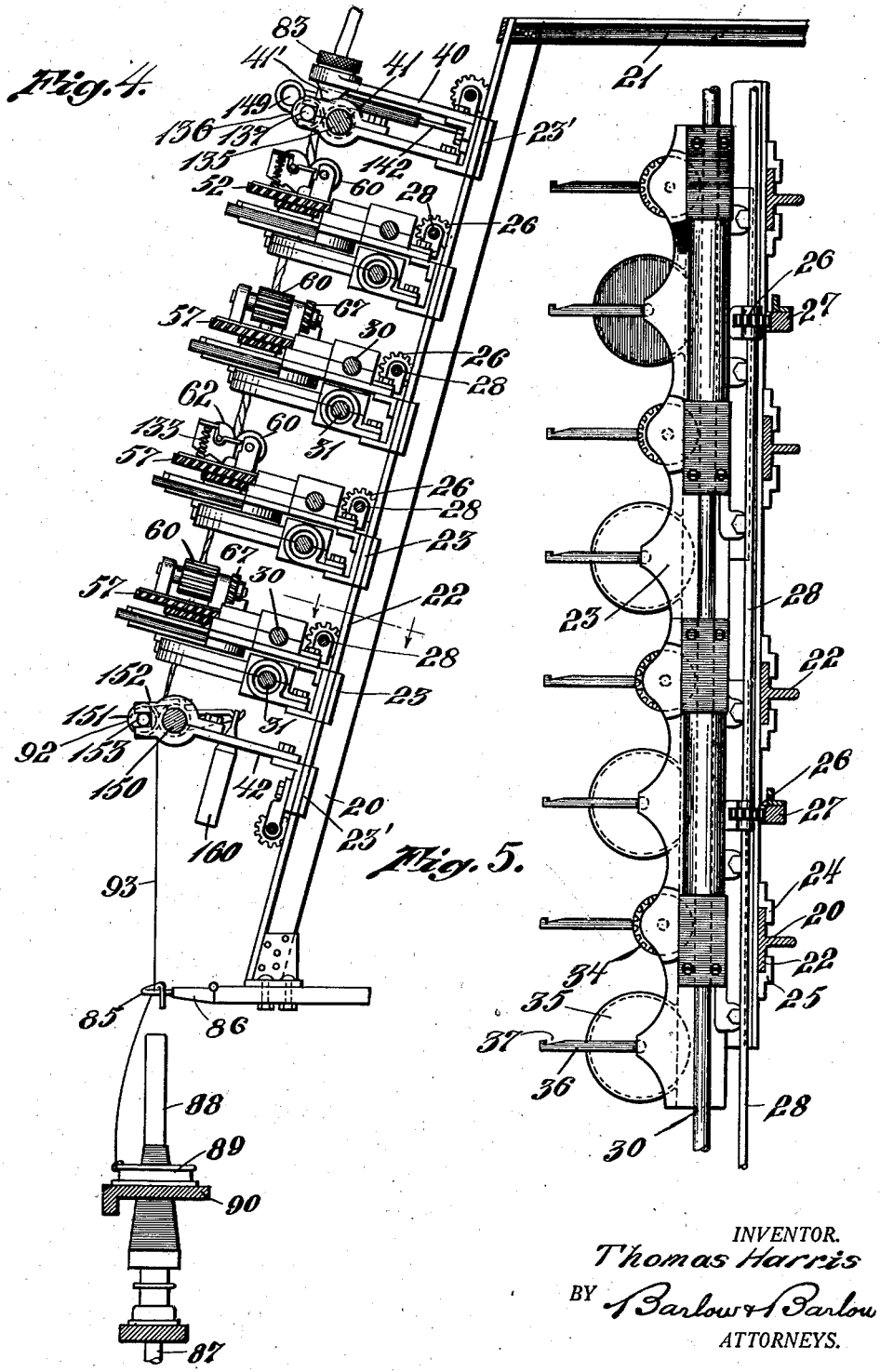

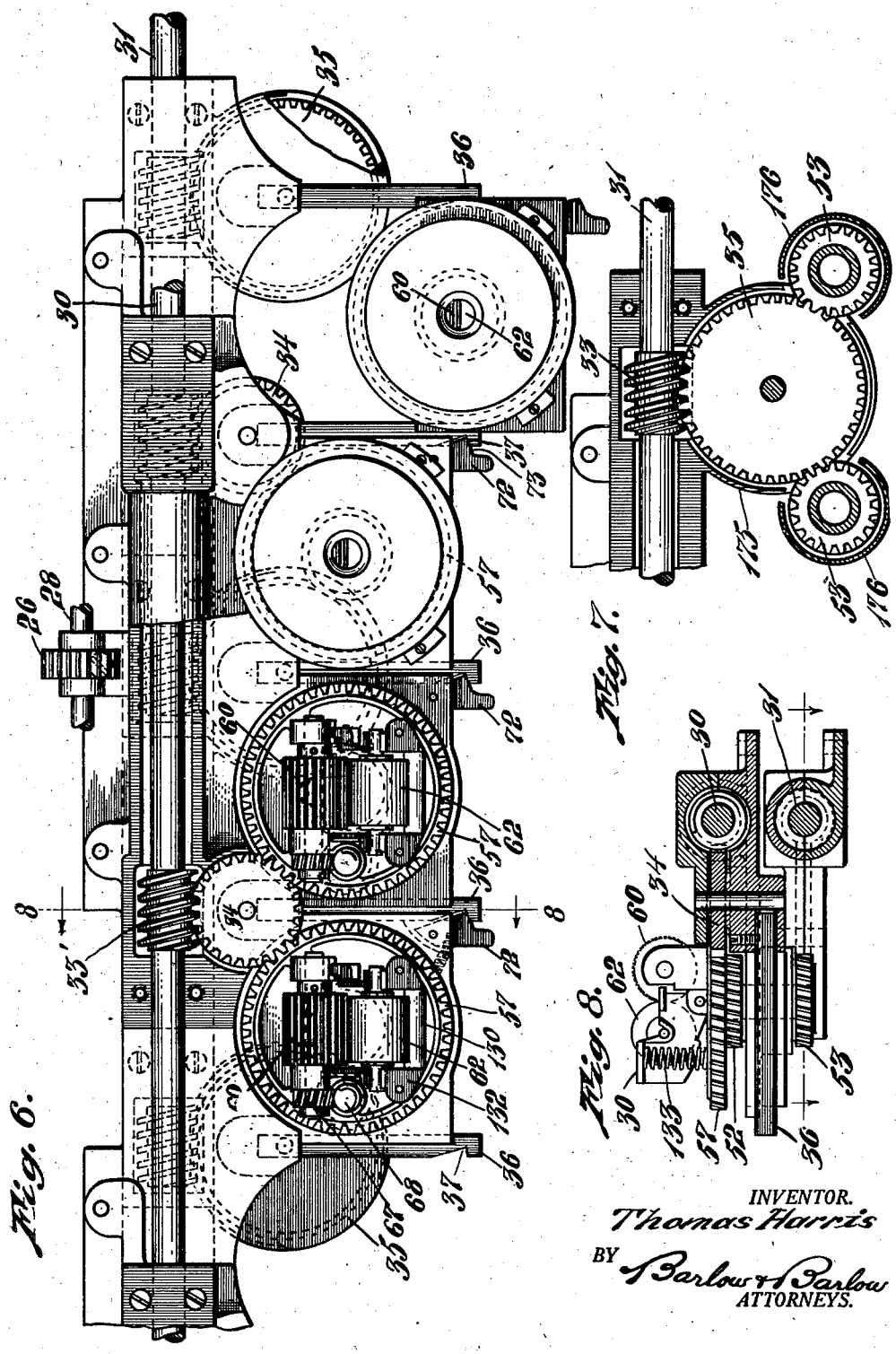

Jan. 17, 1939. T. HARRIS 2,143,876
DRAFTING APPARATUS
Filed Aug. 3, 1935 7 Sheets-Sheet 5

INVENTOR.
Thomas Harris
BY Barlow & Barlow
ATTORNEYS.

Jan. 17, 1939.　　　T. HARRIS　　　2,143,876
DRAFTING APPARATUS
Filed Aug. 3, 1935　　　7 Sheets-Sheet 6
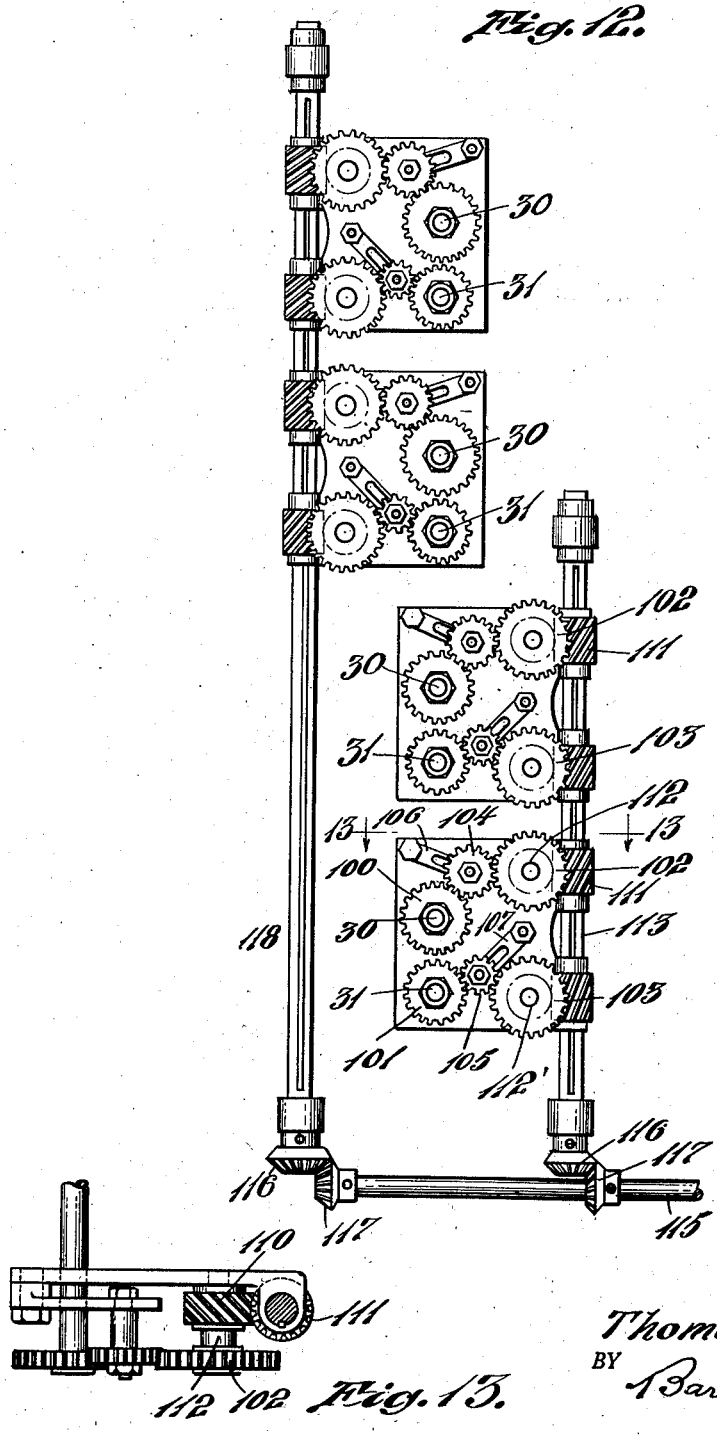
INVENTOR.
Thomas Harris
BY Barlow & Barlow
ATTORNEYS.

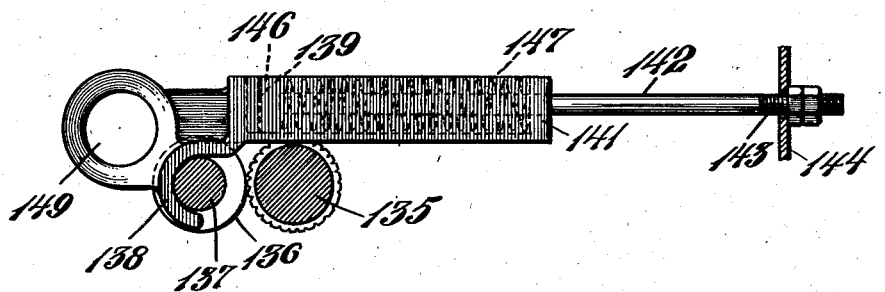
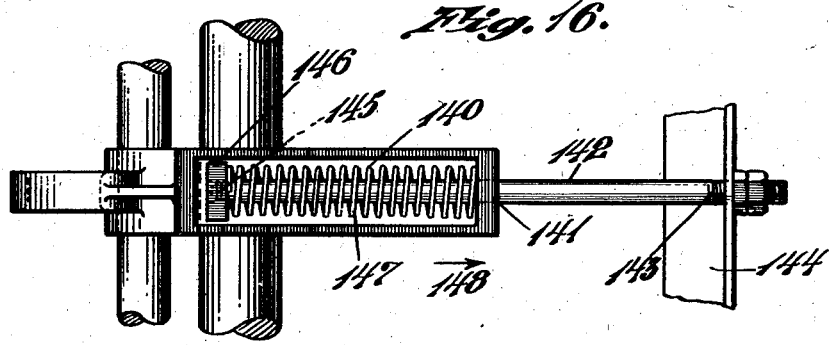
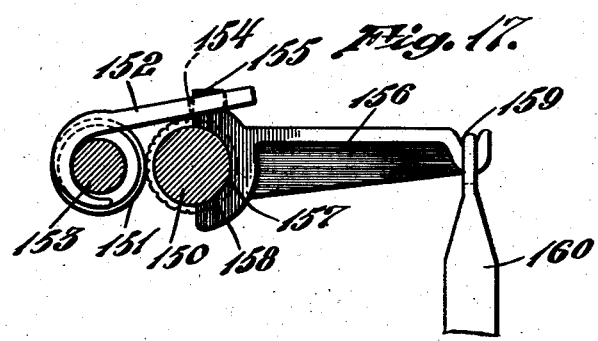

Patented Jan. 17, 1939

2,143,876

UNITED STATES PATENT OFFICE 2,143,876

DRAFTING APPARATUS

Thomas Harris, Providence, R. I., assignor to Harris Textile Machinery Corporation, a corporation of Rhode Island Application August 3, 1935, Serial No. 34,577

14 Claims. (Cl. 19—130)

This invention relates to a drafting apparatus of the general character of that shown in my Patents Nos. 1,922,949 and 1,922,950, dated August 15, 1933.

One of the objects of this invention is the improvement in the driving means for the drafting rolls that they may be more flexible in their relation of rotation for draft and their revolving for causing temporary twist to be placed in the work.

Another object of the invention is the easy adjustment of the distance between the nips of adjacent drafting rolls for accommodation of staple fibres of varying lengths.

Another object of the invention is the simultaneous adjustment of a plurality of the units and the drives therefor throughout the length of the frame.

Another object of the invention is the simplification of the drive while leaving it accessible for changing gears to determine the rate at which the different parts will rotate.

Another object of the invention is the arrangement of change gears for each of the rotating shafts or parts in a readily accessible position for easy access to set up the machine to drive the rolls or temporarily twist the work as desired.

Another object of the invention is the location of all of the change gears at one end of the machine in a head which will be readily accessible for setting the machine to perform the desired work.

Another object of the invention is the arrangement of a packaging means so that the twist placed in the thread at the package may run to the very point of nip of the last pair of rolls for more even distribution of the twists along this extent of the thread.

Another object of the invention is the location of the packaging means in a plane which is tangent to each of the last pair of rolls at the point of nip so that one of the rolls will in no way interfere with the twist or permit any fibres to accumulate thereon by contact therewith.

Another object of the invention is the adjustment between the last pair of nip rolls and the package to vary the length over which the twist may be placed in the yarn.

Another object of the invention is the adjustment of the last pair of rolls relative to the thread guide so that the amount and character of the ballooning which exists in the thread may be nicely governed.

Another object of the invention is the arrangement of the feeding of the work to the drafting rolls so that no tension need exist in the work as it is delivered thereto.

Another object of the invention is the avoidance of the necessity of skewers or spindles for mounting the work to be delivered to the drafting apparatus.

Another object of the invention is the feeding of the work to the drafting apparatus by a surface feed to unwind the supply package of work so that the work may be delivered to the drafting rolls at a definite rate of speed in time with the drawing of the work into the rolls.

Another object of the invention is the location of the work so that it will not contact or friction with any portion of the machine from its supply package to its delivery to the nip of the first pair of rolls of the drafting apparatus.

Another object of the invention is the location of the packages in such a way that the center of the package will be substantially in line or in the plane of the direction of travel of the work through the drafting apparatus.

Another object of the invention is the ready accessibility of the different drafting units and their ready detachment from their driving means for replacement or repair or change from one unit to another.

Another object of the invention is the tensioning means of the rolls to apply tension independently of the weight of the rolls and in a substantially horizontal plane.

Another object of the invention is a tension which will act in substantially a single plane and the plane of each unit for more convenience in storage and the minimizing of space taken up by any one unit enabling the units to be placed closely together.

With these and other objects in view, the invention consists of certain novel features of construction, as will be more fully described, and particularly pointed out in the appended claims.

In the accompanying drawings:

Fig. 3 is a face view of the work supply and fragmental portions of the machine showing the transmission of the work to the guides for the receiving rolls;

Fig. 4 is a view similar to a portion of Figure 1 showing the drafting mechanism on an enlarged scale;

Fig. 5 is a top plan view of a fragmental portion of one of the carriers for the operating mechanism;

Fig. 6 is a fragmental view of a portion of the carrier shown in Figure 5 with the removable units in position thereon with parts broken away to better show the operating mechanism;

Fig. 7 is a plan view of a portion of the drive shown fragmentally as taken from the general arrangement shown in Figure 6;

Fig. 8 is a sectional view on line 8—8 of Figure 6;

Fig. 12 is a skeleton view of the driving gears and shafting for operating various parts of the machine;

Fig. 13 is a top plan view as if looking downwardly in the direction of the arrows on line 13—13 of Figure 12;

Fig. 14 is also a skeleton drive arrangement for permitting adjustment of the various driving gears and showing their driving connection;

Fig. 15 is a side elevation of one form of tension mechanism for the rolls on the upper carrier;

Fig. 16 is a top plan view thereof;

Fig. 17 is a side elevation of the tension mechanism for the rolls on the lower carrier of the machine showing a weighted construction.

Figure 1:
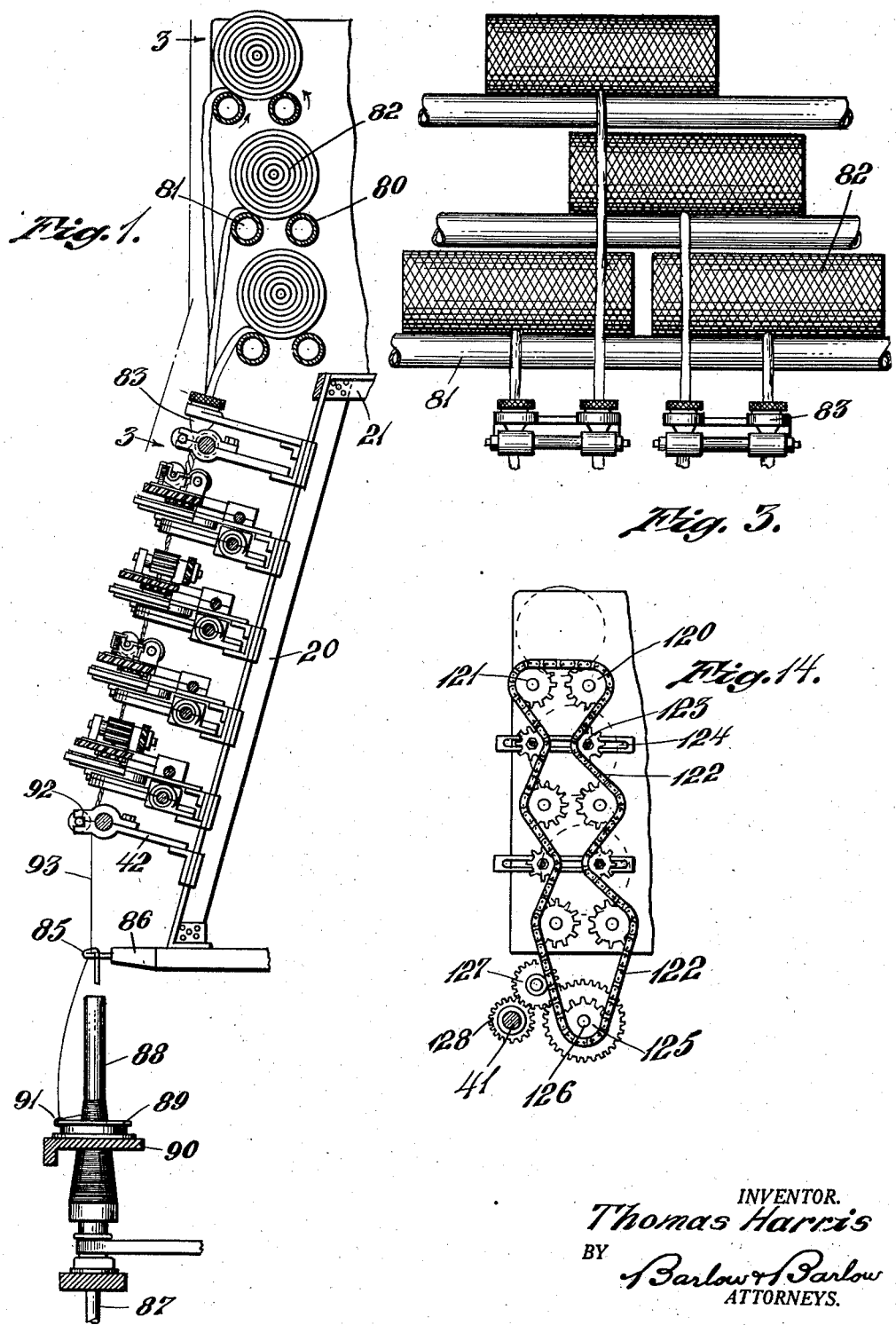
Fig. 1 is a sectional view looking in the direction of the end of the machine.
Figure 2:
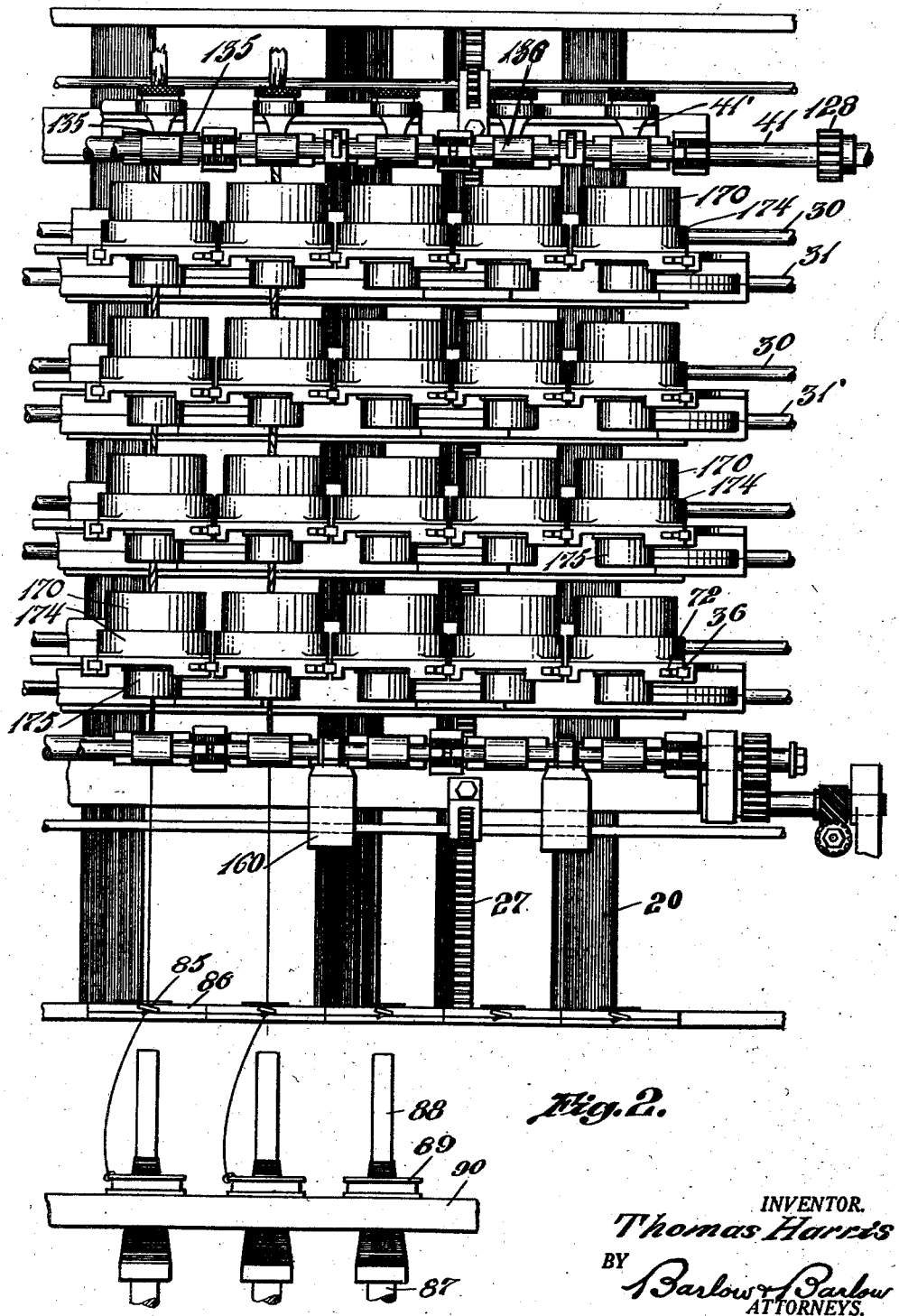
Fig. 2 is a fragmental view looking at the face of the drafting units at generally right angles to their extent and omitting the work supply shown in Figure 1.

The general arrangement and operation of the machine may be first generally pointed out to consist of a framework for the drafting apparatus of a length to support the desired number of spindles. Work in the form of sliver is supplied to a receiving set of rolls and successively acted upon by additional drafting rolls until it finally emerges from the last roll in the desired size of finished thread, which is then given the required number of twists as it is packaged upon a bobbin by some suitable means such as a ring and traveler mechanism here shown. The successive rolls which nip and act upon the work may all be adjusted one relative to the other so that various spacings between the nips can be had and for convenience I adjust all of the top rolls along one side of the machine or all of the bottom rolls on one side of the machine or all of the generally horizontally aligned intermediate rolls along one side of the machine at the same time by means of a shaft extending the length of the machine; and the arrangement is such that the adjustment is performed at one end of the machine, preferably at the driving head end of the machine, whereby the adjustment is thus very materially simplified.

With reference to the drawings, 20 designates a part of the framework of a generally A-shaped frame which supports two back-to-back drafting structures for a multiplicity of spindles or yarn ends. This framework is of a character designed to support the drafting apparatus in the arrangement desired and is suitably strengthened by such cross braces as 21 and other purely mechanical structures for best securing the framework desired. This portion which I have designated 20, although it is part of the framework of the device, also provides a slideway 22 by reason of its structure which is generally T-shaped in cross section and on which the gibs 24 of the adjustable mechanism carriers 23, 23' slidably fit. These mechanism carriers 23, 23' extend generally horizontally along the length of the machine and each comprises a support for removable work contacting roll units as well as a support for part of the shafting for the manipulation of these rolls. The mechanism carriers 23, 23' are arranged one above the other in different horizontal lines and may be adjusted to different horizontal positions by racks 27 fixed on the frame and gears 26 mounted upon each shaft 28 which is suitably supported on the carrier and extends the length thereof and which may be turned by a suitable crank at one end of the machine for moving the carriers to space the nips of the work engaging rolls different distances apart to suit the requirements of the work operated upon.

Each of these carriers 23 intermediate the top and bottom is provided with spaced arms 36 for the reception of each of the removable units which may be slid in along these arms and retained in place by a lock engaging the catch 37 formed by a notch in each of the arms 36 so as to hold this unit in place while the carriers 23' at the top and bottom are provided with a known arrangement of drafting rolls.

Each of the carriers 23 also rotatably supports an upper drive shaft 30 and a lower drive shaft 31 which are suitably driven at one end of the machine, as will presently be more fully described. At intervals along each of the shafts 30 there are located worms 33' which mesh with worm wheels 34 and which in turn engage gears in the removable unit to drive the same, while the shaft 31 is provided with worms 33 which mesh with worm wheels 35 which in turn drive other mechanism in each of the removable spinning units which are mounted in the bracket.

The upper carrier 23' rotatably supports one drive shaft which is the roll shaft upon which corrugations or flutes are provided at spaced intervals and against which the removable companion roll 137 engages to provide a nip for receiving the sliver. An arm 40 is provided on the carrier 23' which supports the conical guide 41' for directing the path of travel of the work. The lower carrier 23' rotatably supports at the ends of arms 42 a drive shaft which as above explained is the roll shaft upon which corrugations or flutes are provided at spaced intervals and against which the removable companion rolls 151 engage to provide a nip for delivering the sliver. The rolls in carriers 23' do not turn about the work as a center, but may be adjusted longitudinally of the travel of the work. In the lower carrier the nip rolls which grip the work form a point, which is adjustable to serve to govern the point of twist and control tensioning and ballooning by reason of the location of the nip with reference to the thread guide 85 below it, whereby I may provide an adjustable span or stretch of the thread in which the twists may more evenly distribute.

Figure 11:
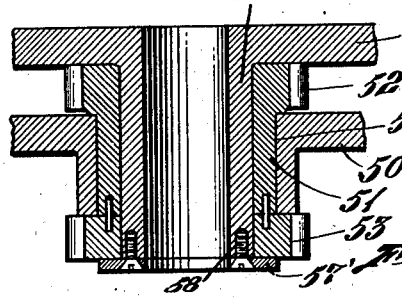
Fig. 11 is a fragmental sectional view showing the arrangement of the parts at the center of the structure shown in Figures 9 and 10.

Each of the removable spinning units mounted in carriers 23 consists of a body member 50 having channels or grooves 50' located therein to receive and slide onto arms 36. At the center of this body member (see Figure 11) in bearing 54 a tubular member 51 is rotatably mounted and provided with a spiral gear 52 at the upper end thereof and a spiral gear 53 at the lower end thereof, all of which is designed to rotate in unison. Within this tubular member 51 there is mounted the hub 55 of a deck plate 56 which has formed on its periphery gear teeth 57 so that it may be driven entirely independently both as to speed or direction from the member 51. A plate 57' is secured to the hub by screws 58 so as to suitably hold the same in position within the member 51 and body member 50.

Draft rolls are mounted upon the deck plate 56 and will revolve as the deck plate 56 is turned. The driven or fluted roll 60 is mounted in bearings 61 while the smooth roll 62 is provided with journals 63 mounted in movable bearings 63' and urged towards the driven roll or fluted roll 60 by some suitable tension means. One tension means which may be employed will later be more fully described. The fluted roll 60 is mounted upon an axle 66 which has a worm gear 67 secured thereto which meshes with the worm 68 extending at right angles to the axis of the shaft 66 and secured on a shaft 70 extending through the plate 56 which is provided with a boss 69 forming a bearing therefor. Upon the lower end of the shaft 70 which extends below the plate I have provided a spiral gear 71 which meshes with the spiral gear 52 on the member 51. Thus when this gear 52 is driven through the member 51 and gear 53 by the gear 35 and worm 33 on shaft 31 rotation will be imparted to the rolls so that they will rotate about their own axes.

The gear 57 on the edge of the deck plate 56 will engage the gear 34 driven by the shaft 30 and will rotate in any direction which it may be desired according to the pitch of the worm 33' and the direction of rotation of shaft 30, whereby the rolls are revolved or turned about the work as a center. The speed of rotation of the rolls about their own axes, however, while affected by the revolving of the deck plate is independent of this revolution and may be merely governed by the differential gearing.

It will be understood that if the hub 51 were to remain stationary and the deck plate 56 revolved, that motion would be imparted to the rolls by reason of the rotation of gear 71 as it traveled about gear 52. The rotation of these rolls may be increased by driving the gear 52 in the opposite direction from the rotation of gear 57. If, however, it be desired that the rolls operate in a different direction than would be caused by the relative rotation of gears 52 and 57 in opposite directions, it will then be obvious that it is merely necessary for me to drive the gear 52 in the same direction as the gear 57, but at a higher rate of speed to cause the rolls to be rotated, the difference in speed determining the speed of rotation of the rolls. Thus, there is provided a differential movement by which the speed of rotation of the rolls and their direction of rotation may be selected. Further, by reason of the rotation of the hub 51 with its gears 53 and 52 being controlled from the shaft 31, the control of the speed of the rolls in all of the units in one line is had at the head or one end of the machine. It will be noted that the gear 34 drives two gears 57 and the gear 35 drives two gears 53.

Figure 9:
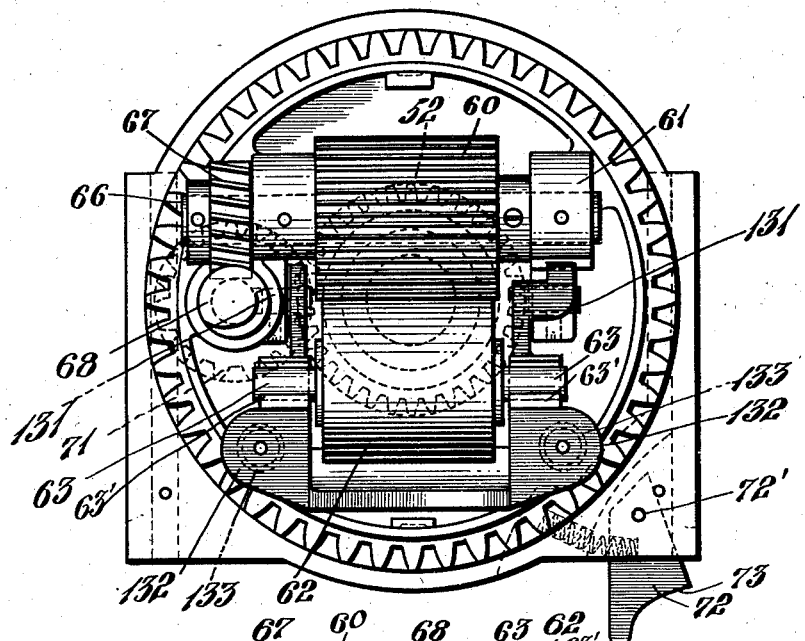
Fig. 9 is a top plan view of the removable unit enlarged from the showing in any previously described figure.
Figure 10:
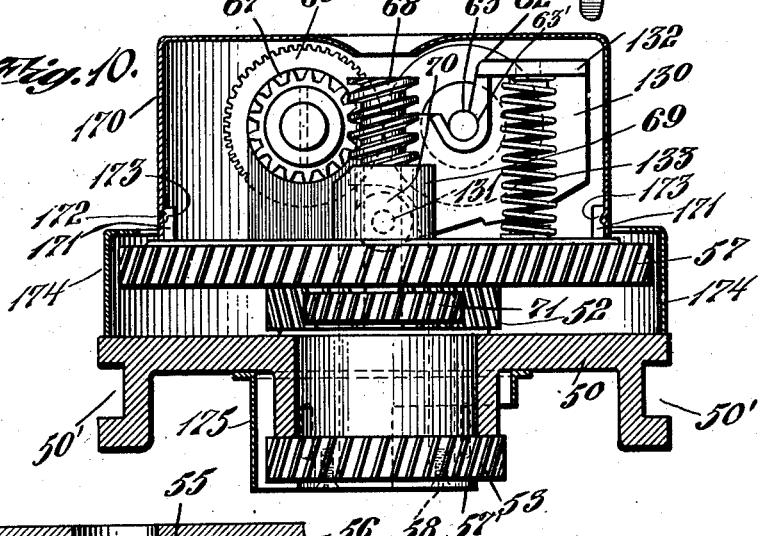
Fig. 10 is a sectional view of the structure in one position.

In order to hold the removable unit shown in Figures 9 and 10 in position the latch 72 has an edge 73 of a shape to engage the catch 37 formed by a notch in the arm 36 so as to hold the member 50 in position and with the teeth of the different gears 53 and 57 in desired driving engagement with gears 34 and 35 which are mounted in each of the brackets along the length of the spinning frame.

The roving or work which is fed to each of the groups of spinning units is mounted above them in package form which are rather cumbersome or large to handle by reason of the loose or fluffy nature of the roving or sliver at this stage of processing; and as the work is bulky, I have provided three tiers of shelves, one above the other for the mounting or supporting of the work, each shelf consisting of two tubes 80 and 81 which are rotatably mounted in suitable bearings and driven in a direction to cause the package of the work 82 to be unwrapped about the roll 82 and feed to the spinning unit at a rate at which the draft rolls can receive it and so that no tension is placed on the work or twist placed therein. In order that the work of each tier shall not touch that of the tier below, I have caused each of these rolls 80 and 81 to be placed outwardly slightly beyond the rolls beneath it, as illustrated in Figure 1, and also in order to better distribute the work I have arranged for the center of these packages 82 to be directly above the tubular guide 83 supported by an arm 40 from the upper carriage 23' through which guide it is fed. There may be just sufficient slack left between the roll 81 and the guide tube so that this slack will be taken up at certain points more than others, as it is necessary that the sliver sometimes feeds from one end and sometimes from the other end of the packages 82.

As the work is delivered, it is directed through a thread guide 85 projecting from the guide board 86 and wound upon the bobbin 88 mounted upon spindle 87 and provided with its ring 89 in ring rail 90 having a traveler 91 all located vertically beneath the nip of rolls 92 and 150 in the lower carrier 23' on the device. The rolls 92 and 150 are in substantially a horizontal plane and the direction of the thread 93 as it leaves these rolls is tangential to the surfaces of the rolls at the point of nip and it proceeds downwardly at right angles to a line joining the centers of the rolls to the bobbin. A certain amount of twist is placed in the yarn by the rotation of the bobbin and traveler mechanism, which twist may be distributed from the traveler all the way to the point of nip between the rolls, there being insufficient frictional contact at the guide 85 to in any way detrimentally affect the distribution of the twist.

Further, as the lower carrier 23' is adjusted, the point of nip of the rolls 92 and 150 will be brought closer to or further from both the thread guide 85 and the package 88 so that the length in which the twist may distribute itself may be nicely governed and also the amount of ballooning and character of the ballooning whether it be two or three short balloons or a few longer balloons or a single balloon may be governed by its distance, all of which may affect the character and quality of the particular yarn which may be formed.

The drive for the shafts 30 and 31 are shown largely diagrammatic in Figure 12. There is provided a gear 100 on shaft 30 and 101 on shafts 31, which in turn are driven by gears 102 and 103 through intermediate or idlers 104 and 105. The gears 100 and 101 are change gears and gears of different size and different number of teeth and may vary throughout a large range for varying the speeds of the shafts which they drive. The idlers 104 and 105 are each mounted on arms 106 and 107 which are slotted so that the gears may be adjusted about the change gears 100 or 101 so that they will properly mesh with the gears 102 and 103 and transmit the motion to the gears 100 and 101 of varying sizes. Each of the gears 102 and 103 are in turn driven by a set of spiral gears 110 and 111 through a shaft 112. Each of these shafts 30 and 31 on the different carriers is similarly driven throughout the frame.

A plurality of different gears 111 are mounted upon the same vertical shaft 113, although these gears are of varying pitches as will be seen from the drawing in Figure 12, to impart different speeds to the gears which they drive for the group of shafts driven, as shown. One vertical shaft, 113, takes care of two sets of units, while another vertical shaft 118 takes care of two other sets of units. The shafts 113 and 118 are in turn driven from shaft 115 through bevel gears 116 and 117. The shaft 115 derives power from some common source which will drive the other back-to-back spinning apparatus in the same manner.

In order to drive the supply package tubes 80 and 81 I have arranged gears 120 and 121 on the ends of each of shafts 80 and 81 and trained a sprocket chain 122 over these gears with adjustable idlers 123 mounted in slotted arms 124, which sprocket chain 122 engages the sprocket gear 125 on the short shaft 126 which is driven by gears 127 and 128 from shaft 41 on the carrier 23', and as the shaft 41 is adjusted, the short shaft 126 is also moved with the carrier and the idler gears 123 are moved into closer relation or further apart in the arms 124 to allow for relative movement of this part of the apparatus with reference to the packaging means which does not move with the upper set of draft rolls.

The units in the carrier 23 which have rolls which revolve about the work as well as rotate about their own axes, have the bearing 63' of the driven roll 62 formed in a cradle support plate 130 which is pivoted at 131 and provided with abutment lips 132 beneath which springs 133 engage to swing the plate 130 about the pivots 131 and cause the bearing 63' to urge the driven roll against the fluted roll or driving roll 60 so as to provide a nip for the work.

I have provided a different tension, however, for the upper rolls which do not revolve about the work as a center and which are formed similar to the usual spinning frame rolls; that is, the spinning roll 135 is a fluted roll, while pairs of leather rolls 136 with a reduced connecting portion 137 between them are engaged at this connecting portion by a finger 138 extending downwardly from the body portion 139.

This body 139 is cut out as at 140 to provide a yoke-like structure and is bored as at 141 to receive a rod 142 which is rockably connected as at 143 to some suitable part of the framework 144, while its end is threaded as at 145 and provided with an abutment 146 to provide a suitable tension on spring 147 so as to urge the body 139 in the direction of the arrow 148. An eye 149 providing a suitable finger piece is formed at the end of the body 139 so that the finger 138 may be readily released for removing the leather roll 136 from position. In this manner a tension is provided in a horizontal plane without resort to the weight of the roll which is customary in the prior art.

I have also provided a different tension which is employed on the lower set of rolls, neither of which sets revolves about the work as a center.

The lower set of rolls are similar to the upper set in that there is a driven fluted roll 150 similar to the fluted roll in the ordinary spinning unit. The leather roll 151 is moved toward this fluted roll by a compound lever arrangement. A hook-shaped member 152 engages the connection 153 between a pair of the leather rolls and is provided with an opening 154 which receives the projection 155 on the arm 156 which has an arcuate end 157 to receive the smooth or bearing portion 158 between the fluted sections of the driven roll. At the end of the arm 156 a notch 159 is provided for the reception of a weight 160 which hangs thereon. This weight tends to swing the arm 156 down and applies tension or pull on the projection 155 and thus pulls the hook 152 to cause the leather roll to be drawn towards the fluted roll while thrust is applied against the fluted roll by means of the arcuate bearing 157.

In order to cover and protect the gears which are exposed as shown in Figure 1, I have covers consisting of a cup 170 which will engage the fingers 171 on the deck plate, and by means of detents 172 entering recesses 173 in the fingers is held in place. Other enclosing covers 174 may be mounted about the gear 57 and guards 175, and 176 for the differential gearing may also be provided.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a drafting apparatus, a plurality of units in generally horizontal alignment and each having drafting means, and a plurality of similar units at a different horizontal alignment, all units in one line being at substantially the same horizontal level, and common horizontal shafts independent from the drafting means for driving the units of each group in the same horizontal line to draft the yarn.

2. In a drafting apparatus, a plurality of units in each of several different planes and each having drafting means, and common shafts independent from the drafting means for driving a plurality of the units in the same plane to draft the yarn.

3. In a drafting apparatus, a plurality of draft units for each work end, each unit being in substantially the same plane as a corresponding unit for the next work end, and each unit having draft rolls rotatable about their own axes and revolvable about the work as a center, a common shaft to rotate the rolls of all units in the same plane, and a second common shaft independent of the first shaft to revolve the rolls of all units in the same plane.

4. In a drafting apparatus, a plurality of units for each work end and each having a drafting means, each unit being in substantially the same plane as a unit for the next work end, a common shaft for driving a plurality of the units in the same plane to draft the yarn, and another common shaft for driving a plurality of units in another plane, and means including change gears at the end of the shafts for driving each of said shafts.

5. In a drafting apparatus, a plurality of groups of draft units for each work end, each unit being in substantially the same plane as a unit for the next work end, and each provided with draft rolls rotatable about their own axes and revolvable about the work as a center, a common shaft to rotate the rolls of a plurality of units in the same plane, a second common shaft to independently revolve the rolls of said plurality of units about their work as a center, and means including change gears for driving each of said shafts.

6. In a drafting apparatus, a plurality of units for each work end and each having drafting means, each unit being in substantially the same plane as a unit for the next work end, a common shaft for driving a plurality of the units in one plane to draft the yarn, and another common shaft for driving a plurality of units in another plane, and means including change gears for driving each of said shafts, said change gears being all located at one end of the apparatus.

7. In a drafting apparatus, a plurality of groups of generally vertically aligned units each having drafting rolls independent of the next unit, and a common generally horizontal shaft for driving the rolls of one unit of each of said groups each of said units comprising a pair of rolls being bodily removable from the common driving shaft.

8. In a drafting apparatus, a plurality of groups of vertically aligned draft units, and a common generally horizontal shaft for driving the rolls of a unit of each of said groups to rotate the rolls thereof, and a second common generally horizontal shaft for independently driving the rolls of each of said units to revolve the rolls about the work as a center.

9. In a drafting apparatus, a plurality of draft units for each work end, each unit being in substantially the same plane as a unit for the next work end, and each provided with draft rolls rotatable about their own axes and revolvable about the work as a center, a common shaft to rotate the rolls of a plurality of units in the same plane, and a second common shaft to independently revolve the rolls of a plurality of units, and means for vertically adjusting the units in one plane and said shafts simultaneously.

10. In a drafting apparatus, a plurality of pairs of draft rolls spaced horizontally, and means for engaging the surface of the work to feed the work to the first pair of rolls, the work being arranged on a plurality of packages at a plurality of levels and in different vertical planes, each package at one level overhanging the one below sufficiently to cause the work to clear the one below it.

11. In a drafting apparatus, a plurality of pairs of draft rolls spaced horizontally for different ends, means for engaging the surface of the work to feed the work to the first pair of rolls, the work being arranged in a plurality of packages at different levels, one package disposed with its center in substantially the plane of the line of draft between one of said pairs of draft rolls and others disposed with their centers in the same planes as the planes of draft of other draft rolls, and each overhanging the one below it sufficiently to cause the work to clear the one below it.

12. In a drafting apparatus, a plurality of draft units in a common plane for a plurality of work ends, each unit having draft rolls rotatable about their own axes and revolvable about the work as a center, and means including two different common shafts parallel to said common plane for differentially rotating and revolving said rolls of a plurality of said units.

13. In a drafting apparatus, a plurality of draft units in a common plane for a plurality of work ends, each unit having draft rolls rotatable about their own axes and revolvable about the work as a center, means including two different common shafts parallel to said common plane for differentially rotating and revolving said rolls of a plurality of said units, and means for simultaneously vertically adjusting the units of said plane.

14. In a drafting apparatus, a plurality of units for each work end each having drafting means, each unit being in substantially the same plane as a unit for the next work end but independent thereof, a common shaft for driving a plurality of the units in the same plane, each of said units comprising a pair of rolls being bodily removable from the common driving shaft, and means for independently vertically adjusting the units in one plane simultaneously.

THOMAS HARRIS.